Sept. 20, 1971 A. F. KAY 3,605,284
EDUCATIONAL DEVICE
Filed Feb. 10, 1969 4 Sheets-Sheet 1
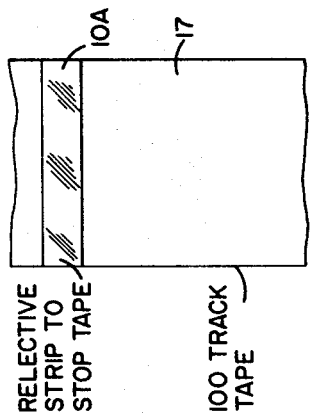
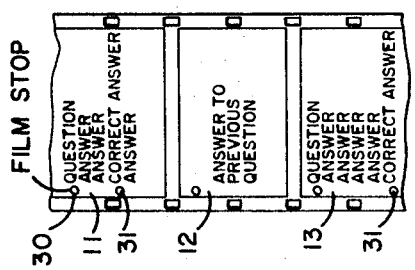
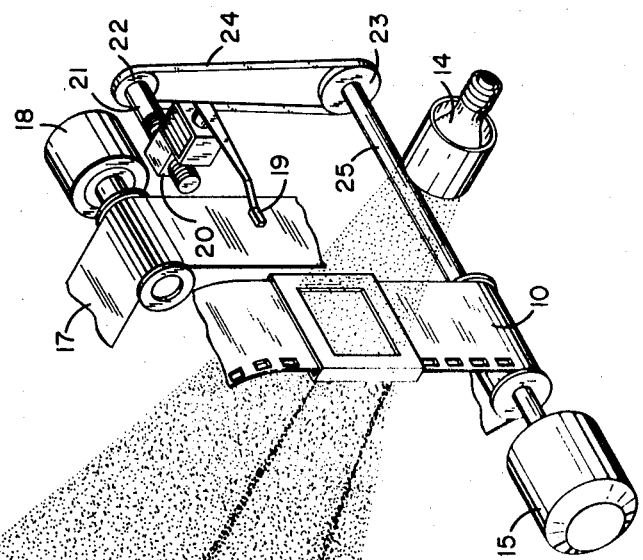
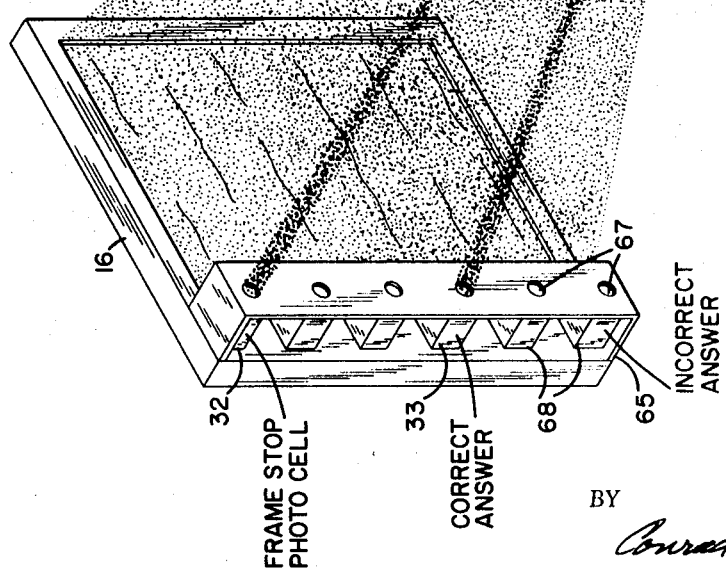
INVENTOR.
ANDREW F. KAY
BY
ATTORNEY Sept. 20, 1971  A. F. KAY  3,605,284
EDUCATIONAL DEVICE Filed Feb. 10, 1969  4 Sheets-Sheet 3

INVENTOR.
ANDREW F. KAY

BY

ATTORNEY

United States Patent Office 3,605,284
Patented Sept. 20, 1971

3,605,284
EDUCATIONAL DEVICE
Andrew F. Kay, 340 Serpentine Drive,
Del Mar, Calif. 92014
Filed Feb. 10, 1969, Ser. No. 806,337
Int. Cl. G09b 7/02
U.S. Cl. 35—9
6 Claims

ABSTRACT OF THE DISCLOSURE

My invention comprises essentially an audio-visual educational device including optical means for displaying a series of questions and answers in alternating frames and an auditory system synchronized with and explaining the visual answers; the advancement of the successive frames being dependent upon the selection of a true or false answer, wherein a selection of a true answer advances the visual portion forward to the next question and the selection of a false answer advances said visual portion to the correct answer and causes the actuation of the auditory means.

---

The foregoing abstract is intended as a brief statement of the invention and is not intended to be a limitation thereon, the only limitation intended is included in the appended claims.

My invention relates to a teaching device and is particularly concerned with an electro-mechanical system combining visual and auditory material in the most efficient manner for assisting and advancing the learning process. It will be readily apparent that the system and combination is adaptable to a wide range of subject matters. In view of the fact that it was developed primarily for use in connection with vocabulary building, the description and specifications hereinafter following will be oriented to this field of education. It will however, be understood that it is not the intention to confine or limit the invention to such use.

It has been amply demonstrated that students learn more rapidly at the threshold of their knowledge. In the event that a great bulk of material is presented which is already known, the students are apt to lose interest and become bored and therefore decrease their efficiency. In the event that a great deal of material beyond their comprehension is presented, they will be overwhelmed and again will lose interest. It has been found it is at the threshold between the known and unknown where most students progress most rapidly.

It is therefore realized that the students attention must be constantly directed to this threshold zone and that the design of a teaching device should include this objective. It is therefore among the primary objects of my invention to provide a teaching device wherein the material presented to a student which is already known to him will be quickly bypassed and new material of unknown nature presented.

Also ideally, a teaching device should present the material in a form graduated from low level to a higher level and should be designed to permit each individual student to quickly pass over that that is known without spending undue time waiting for the machine to move to the higher levels so that the student will not lose interest by boredom.

Other attempts are known in the prior art at designing educational devices wherein there is combined a visual presentation of the material either by slides or photographic film coupled with auditory presentation by means of magnetic tape or other sound reproducing means. These prior art devices have usually taken the form of a combination photographic slide, more or less synchronized with a magnetic tape which said tape is of sufficient length to contain the necessary auditory message. In the event that the question presented either visually or by auditory means, is one quite familiar to the student, either he must wait an inordinate amount of time for the tape to pass to the next subject or the tape must be speeded up to move to the next index point.

Unless the tape is speeded up, large amounts of non-productive time will be wasted waiting for the tape to move to the next index point. In the event the tape is speeded up, complex two speed operating systems must be employed and the rapid movement of the tape past the tape pick-up head results in serious wear on the head.

As will be seen, one of the primary advantages of my invention is that when the student determines that the particular subject presented is known to him and wishes to pass to the next subject, the device can very quickly move to the next index point without any movement of the magnetic tape and therefore with substantial saving of time, interest of the student and wear on the tape pick-up head.

The arrangement which will be hereinafter described, permits attainment of one of the objectives of an ideal teaching device, namely one which permits the student to quickly skip over known material to the unknown in the sequence of difficulty without wasting undue time or resulting in excessive wear and maintenance in the machine.

It has been found in the prior art, that difficulty is experienced in keeping separate visual and auditory presentations synchronized. Where such presentations are physically separated either complex sound or electronic tones or signals must be placed on the tapes in order to properly synchronize the presentations. This results in additional and complicated electronic circuitry. Such circuitry is eliminated when the visual and auditory presentations are packaged in a single replaceable cartridge and are mechanically interlocked so that they cannot in the course of normal usage get out of synchronization.

In order to overcome most of the serious objections of the prior art devices and to devise a teaching machine which is much more efficient and easier to operate than the prior art devices, I have provided a film having a plurality of frames, each frame containing a visual message in any desired order and a magnetic tape formed as an endless loop having a plurality of parallel sound tracks. The visual film and the sound tape are packaged in a cartridge for disposition into a machine having a magnetic pick-up head which moves perpendicularly across the sound tracks to select successive messages corresponding to the sequence of visual messages. I have provided a mechanical interlock between the position of the visual frames and the corresponding perpendicular position of the sound head so that the proper sound track will be selected.

The selection and movement to a given sound track is brought about by a relatively slow movement of the pick-up head over the film rather than high speed as heretofore required. A low speed movement is permissible because of the short distance required to move to the next parallel track. Wear of the tape or pick-up head caused by movement of the head over the film is minimized.

Such an arrangement permits the use of a simple motor drive with a simple one speed clutch. No fast advance or rewind is necessary. A further advantage of the endless loop tape having parallel sound tracks lies in the fact that, if it is desired to repeat the auditory message, the student may do so without waiting for a rewind of the tape by the simple expedient of over-riding a stop signal.

A further advantage of the device hereinafter described lies in the fact that it is relatively simple to shift from one track to the next or over several tracks or positions without running through the entire sequence.

The foregoing objects and advantages will become more readily apparent from the appended drawings and the specification descriptive thereof.

In the drawings:

FIG. 1 is a partial schematic perspective view of a device embodying the principles of my invention.

FIG. 1a is a section of one form of film used in my invention.

FIG. 1b is a section of magnetic tape used in my invention.

Figure 2:
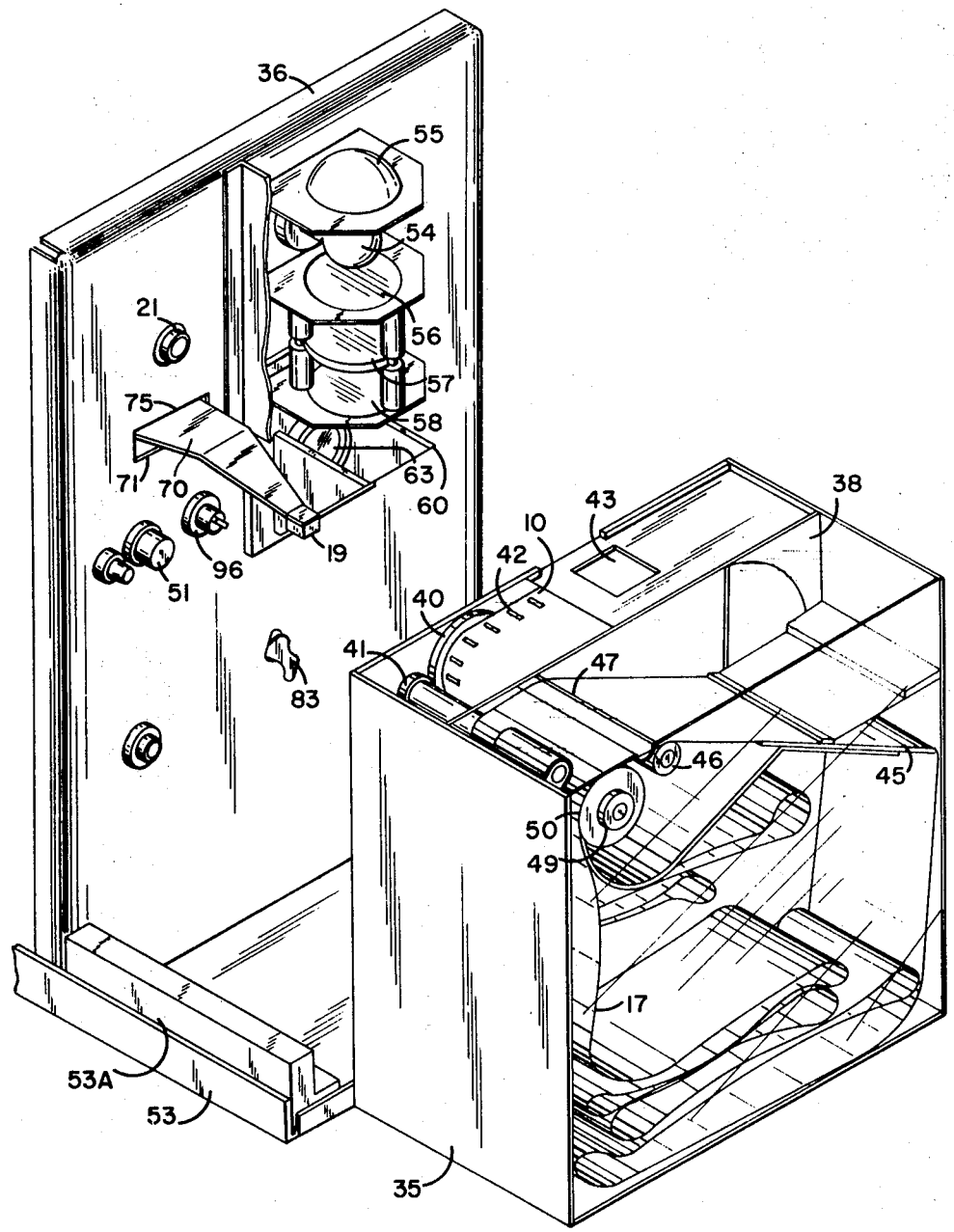
FIG. 2 is a perspective view of the film cartridge and means for mounting and driving the same.

Before explaining the details of the above mentioned drawings it is deemed advisable to explain the general mode of operation of one example of an educational device embodying the principles and system of my invention. The user is confronted with a screen upon which slides or pictures may be projected. At a convenient place on the face of the machine are a plurality of selector switches or actuating levers. Each lever corresponds to one of multiple choice answers for the operator to select. A word together with its usage is projected onto the screen. Several synonyms are listed below, one of which is the best answer. The student presses the selector switch or actuating lever corresponding to what he feels to be the best synonym. In the event that the student is correct the machine will automatically advance to the next word and synonym combination in sequence, at which time the student will again select what he considers the best answer. During the time of movement from one visual frame to the next there is no movement or actuation of the tape mechanism therefore very little time is required.

In the event the student depresses an erroneous selector switch or actuating lever the correct answer will be projected on the screen and the magnetic tape will be actuated to give the correct answer orally. Upon completion of the correct answer the machine will automatically advance to the next question.

Thus it will be seen that the student does not have to wait while a tape message advances through its full cycle. Also, there will be a minimum of wear on the tape head.

Referring to the visual section of the teaching system and particularly with reference to FIG. 1 it will be noted that I have provided a light transmitting film such as 10 having a plurality of individual frames illustrated in FIG. 1a as 11, 12, and 13. Means for projecting light through said film includes a source of light and lens system designated generally 14, motor means 15 for advancing the film from one frame to the next and a viewing screen assembly designated generally 16.

The auditory section of the teaching system includes a magnetic tape 17, motor means 18 for driving the magnetic tape 17, and a magnetic pick-up head 19 mounted on a carriage 20, the position of which is controlled by a screw shaft 21. The shaft 21 is interconnected to the motor 15 by means of a system of pulleys 22 and 23 a belt drive 24 and shaft 25.

Thus it will be seen that each time the motor 15 is actuated to advance the film 10 to a new position the shaft 25 through the associated belt and pulley system will rotate shaft 21 to move the carriage 20 and therefore the pick-up head 19 perpendicularly across the face of the magnetic tape. The magnetic tape carries a plurality of parallel tracks.

The film 10 is formed with a plurality of light transmitting spots such as 30 and 31 whereby light from the source 14 is projected selectively to one or two of a plurality of light sensitive photo cells such as 32 and 33 mounted on the back of the viewing screen 16. It will be noted that each successive frame is formed with the light transmitting spot 30 in the same relative position. It will also be noted that only those frames such as 11 and 13 which contain a question are provided with a light transmitting spot 31. These spots 31 will be in differing positions depending upon the position of the correct answer as will hereinafter become more clearly explained.

Figure 3:
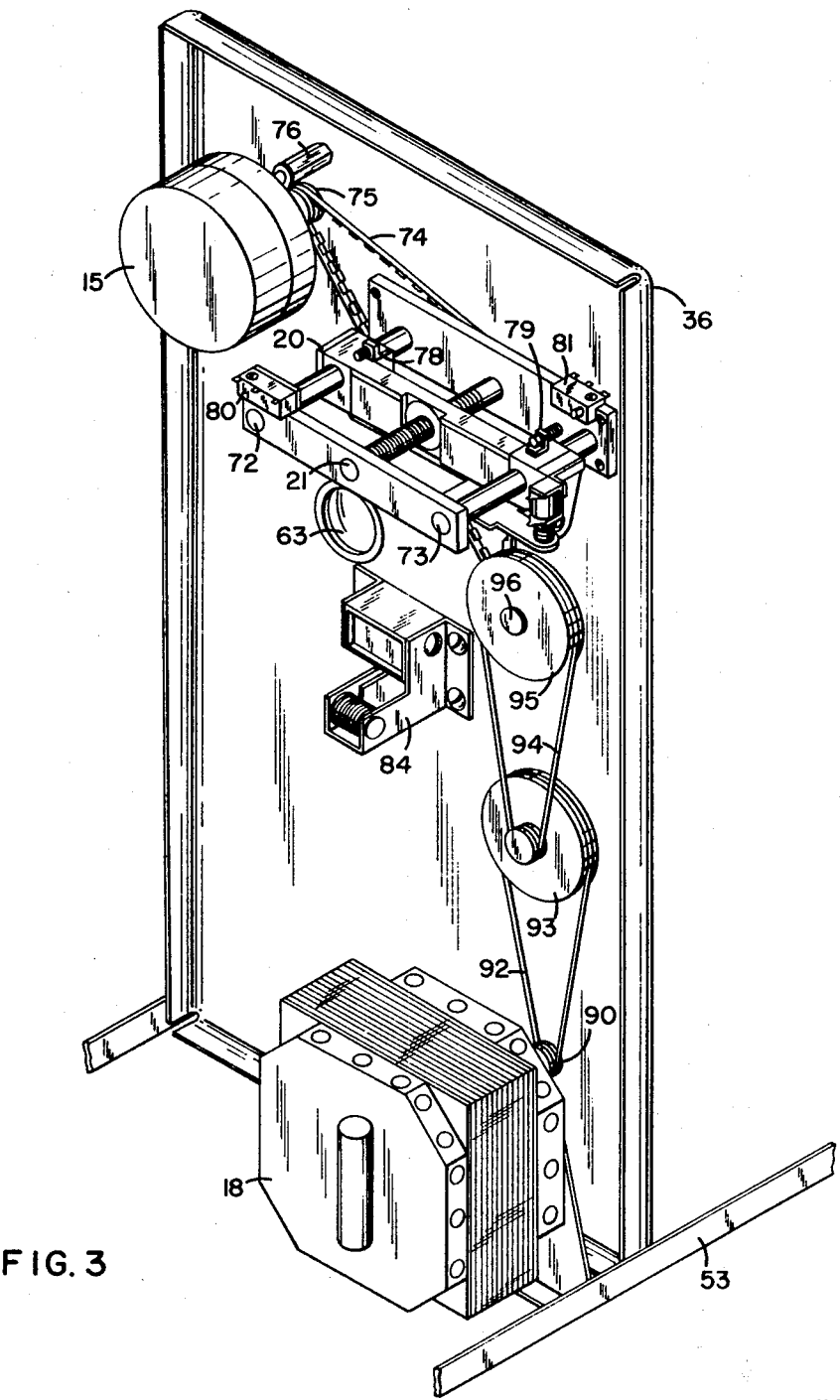
FIG. 3 is a perspective view of the cartridge mounting section shown in FIG. 2 but taken from the back side thereof.

Referring now more specifically to FIGS. 2 and 3 wherein I have illustrated in perspective view certain essential parts of one embodiment of my invention. It will be seen that I have provided a cassette or cartridge designated generally 35 adapted to be removably disposed in operative position on a mounting panel designated generally 36.

The cassette or cartridge 35 is generally a box-like structure having a partition 38 dividing the box-like structure into two compartments which for the sake of convenience will be designated "film compartment" and "tape compartment."

The film 10 which is disposed in the film compartment of the cartridge 35 may either be an endless loop or may be wound on supply and take up reels. These expedients are well known to the art and are not shown in detail herein. The film is threaded over a sprocket 40 and is driven by means of a sprocket shaft 41. The shaft 41 is adapted to engage the sprocket holes 42 in the film 10 in a manner well known to the art.

The top of the cartridge 35 is formed with an aperture 43 adjacent which each successive frame, such as 11, 12, or 13 of the film 10 is adapted to be disposed and through which light from the source of light, designated generally 14 (FIG. 1), passes.

The tape compartment of the cartridge 35 is adapted to receive an endless loop tape 17 in a manner well known to the art. The tape passes up over a guide plate 45 to a pulley 46 past a slot 47 over a drive pulley 49 back into the storage chamber at the bottom of the cartridge 35.

The pulley 49 is secured to a shaft 50 which extends through the rear face of the cartridge 35 to engage a driving means such as the shaft 51 when the cartridge 35 is in operative position.

The cartridge mounting panel 36 is secured to a base 53.

The light focusing and transmitting system designated generally 14 in FIG. 1 is secured to the mounting panel 36 and is composed of a source of light 54, a reflector means 55 positioned immediately above the light source 54, a lens system including lenses 56, 57 and 58 adapted to focus the light source 54 onto the film 10 through the aperture 43 when the cartridge 35 is in operative position.

A reflector means such as a mirror 60 extends through an aperture in the back face of the cartridge 35 and under the film 10. The reflector 60 is adapted to reflect the light passing through the film 10 outwardly through lens 63. The lens 63 focuses the light message on the film 10 onto the screen 16. It will be noted (again referring to FIG. 1) that the back side of the screen viewing frame 16 has mounted thereon a bracket 65 formed with a plurality of apertures such as 67. Positioned immediately adjacent each said aperture 67 and on the reverse side of the bracket 65 are a plurality of light sensitive photo electric cells such as 68. The purpose and function of these will be explained later, suffice to say at this time that the light transmitting spots 30 and 31 on the film 10 permit the light source 14 to selectively shine a beam of light into one of the apertures 67 to activate one of the photo electric cells 68.

The magnetic pick-up head 19 is mounted to an arm 70 which extends through aperture 71 in the panel 36 and is secured to the carriage 20 on the reverse side.

The carriage 20 is slideably supported by parallel rods 72 and 73 and is in threaded engagement with shaft 21 so that the rotation of the shaft 21 causes the carriage 20 to slide alternately back and forth on the rods 72 and 73. Sprocket means are secured to the inner end of shaft 21 and are driven by means of a belt 74 actuated by the motor 15 and pulley 75. The motor 15 as shown is secured to the panel 36 by means of standoff posts such as 76.

The belt 74 extends downwardly to engage a pulley (not shown) mechanically secured to the shaft 51 so that there is a mechanical interlock between the movement of the film 10 caused by rotation of the shaft 51 and the positioning of the magnetic pick-up head 19 as caused by rotation of the shaft 21 thereby insuring at all times a positive synchronization between the positioning of the frames such as 11, 12, and 13 (see FIG. 1) and the positioning of the pick-up head 19 with respect to the desired channel on the tape 10.

The carriage 20 is provided with a pair of switch actuating members 78 and 79 adapted to actuate microswitches 80 and 81 respectively to cause reversal of the motor 15 for rewinding the film 10 to the starting position and resetting the magnetic pick-up head to the starting channels upon the completion of the particular sequence housed in the cartridge 35.

In order to insure at all times that the cartridge 35 will not be removed after it has gone through only a portion of its cycle and would, therefore, not be ready for commencing the next time it is used, I have provided a locking device such as a latch 83 adapted to engage a slot in the back of the cartridge 35 which said latch is controlled by a magnetic device of any suitable nature such as 84. The magnetic device 84 is electrically controlled by the position of the carriage 20. In other words, the latching mechanism can be disengaged only when carriage 20 and film 10 are in starting position.

The tape driving means comprises the motor 18 mounted on the base 53 having a pulley 90 and a train of belts and pulleys 92, 93, 94 and 95 for driving the tape. The pulley 95 is connected to a shaft 96 which engages the shaft 50 when the cartridge 35 is in operative position. It will be understood that the motor 18 and its respective tape drive will be actuated independently of the motor 15 and will cause the tape to move past the pick-up head 19 only when a given message is desired and therefore the tape will only be moving a portion of the time and at a relatively low speed.

The tape 17 as previously disclosed is an endless loop of tape and is formed at a point between the end and beginning of the desired message with either a transparent section or reflective strip such as 10a (FIG. 1b). The purpose is to actuate an electronic circuit for the purpose of interrupting the circuit driving motor 18. Thus it will be seen that the only time the tape 17 is in motion is when it is desired to hear a given channel and when the channel is completed no necessity exists for rewinding the tape or at any time moving the tape at high speeds.

Also in the event it is desired to repeat the message without further advancing the visual tape an override switch can easily be provided so that the student by actuating said switch can cause the tape 17 to run through a second or more cycles. In order to better understand the operation of my invention reference is again made to FIGS. 1, 1a and 1b. It will be noted in FIG. 1 that a plurality of light sensitive photo electric cells such as 32 and 33 are mounted on the reverse side of the viewing screen 16 and are masked against a light except for holes 67. Each frame of the film as shown in FIG. 1a is provided with a light hole which can be either a transparent portion of the film or an aperture therethrough. The purpose of the light hole 30 is to position each frame as will be later explained.

The light holes 31 vary in their relative position on each frame depending on the position of the correct answer. The film as shown in FIG. 1a is provided alternating question frames and answer frames. In the event that the selector switch corresponding to the correct answer is depressed the control circuitry causes the film to advance to the next question frame. In the event that an erroneous answer is depressed the control circuitry will cause the film to advance to the answer frame and will actuate the magnetic tape which will operate until it has moved through its entire cycle at which time the reflective strip 10a will actuate the circuit to stop the tape drive motor and actuate the film drive motor to advance the film to the next question frame.

Figure 4:
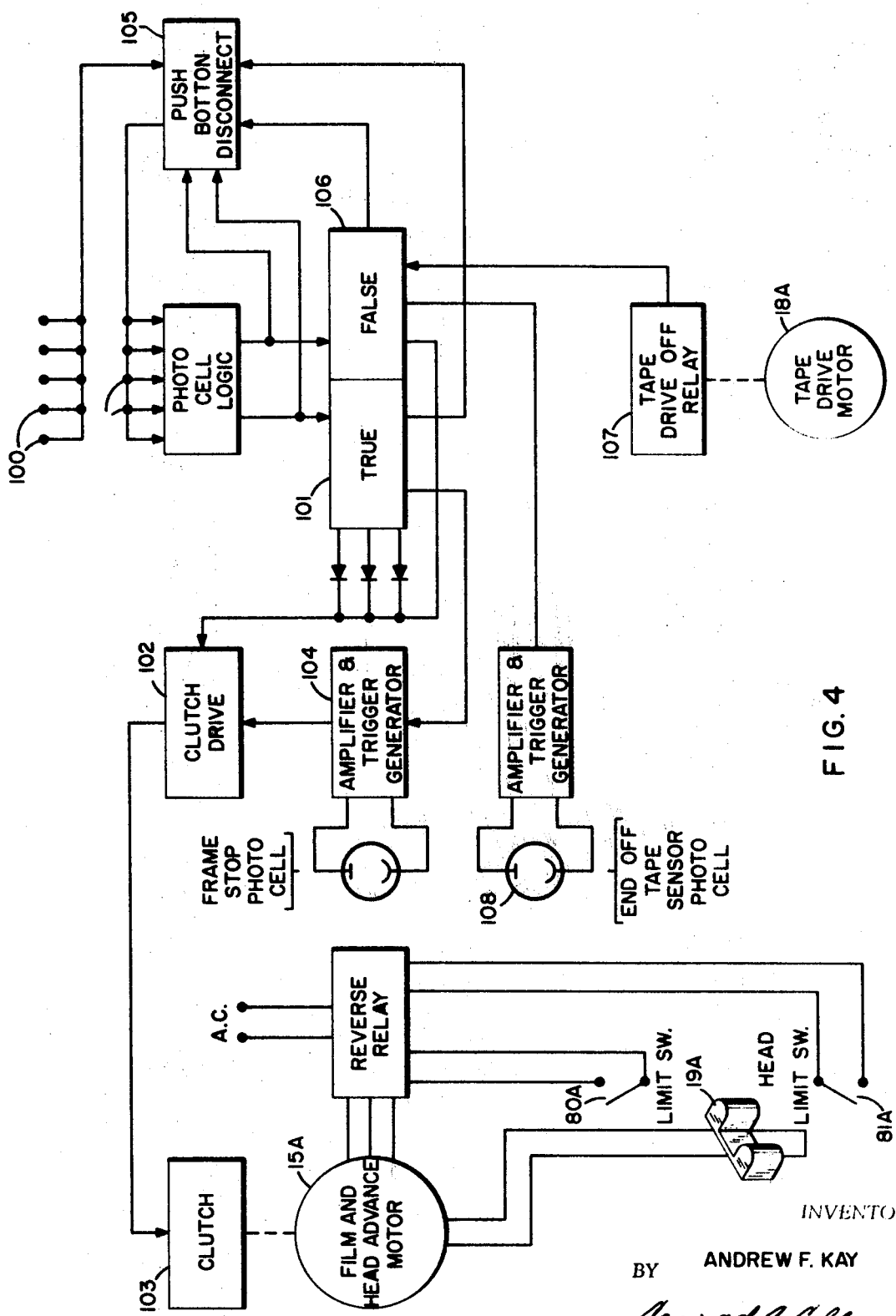
FIG. 4 is a functional schematic diagram explaining the function and operational flow of my invention.

The film drive circuit will be actuated at all times unless the photo cell 32 is energized by a light beam. A better and more comprehensive understanding of the operation of my invention by reference to the schematic illustration of FIG. 4.

For the sake of convenience I have illustrated a plurality of selector switches such as 100 associated with the respective photo cells 68 designated herein as 68a and associated with a photo cell logic circuit.

In the event the student selects the switch corresponding to the "true" or correct answer and therefore actuates the switch 100 which corresponds with the photo cell 68a that is being energized by the light beam (as seen in FIG. 1), the photo cell logic circuit causes a pulse to be generated in the "true" flip-flop circuit designated generally 101. The photo cell logic also pulses a push button disconnect circuit 102.

The "true" flip-flop circuit generates a pulse to actuate the clutch drive circuit 102 engaging clutch 103 to operate the film advance motor 15a. The film advance motor also advances the magnetic head 19a.

Upon actuating the clutch 103 and starting movement of the film advance motor the light hole 30 is moved to cut off the source of light to photo cell 32. The motor continues to run until the cell 32 again sees a light in the next film frame.

When the frame stop photo cell 32a sees another light it generates a pulse to reset the "true" flip-flop circuit to its original condition thereby generating an additional pulse to drive the clutch circuit 102 and the clutch 103 again moving the second frame 12 off the light spot cutting off the beam of light to the frame stop photo cell 32 causing the motor to continue to advance the film until the frame 13 permits a light beam to again contact the photo cell 32a. The photo cell 32a causes a trigger pulse to be generated in the trigger generator circuit 104. However, since the "true" circuit has already been reset the new pulse causes the clutch 103 to be disconnected and stop the film.

In the event the push button 100 is depressed corresponding to a false answer the photo cell logic circuit causes a pulse to be generated in the "false" flip-flop circuit 106 and at the same time causing a pulse in the push button disconnect circuit 102 to deactivate the push button. The "false" flip-flop circuit energizes the clutch drive circuit 102 to engage clutch 103 to cause the film drive motor 15a to advance the film until the frame stop photo cell 32a again sees a light spot. Upon seeing a light spot the trigger generator circuit causes the clutch 103 to be disconnected thereby stopping the film on the answer frame. At the same time the "false" circuit causes the tape drive relay 107 to be engaged causing the tape drive motor 18a to be energized and drive the tape past the head 19a.

The tape 17 continues to run until the light reflective strip 10a causes light to activate the end of tape sensor photo cell 108. Energizing the photo cell 108 causes disconnecting of the tape drive motor 18a and generates a pulse to cause energization of the clutch 103 to advance the film to the next question frame.

At the end of the film, that is, after the last question and answer, the film is dark so that no light can energize photo cell 32 therefore the motor 15 continues to run until the reversing limit switch 81 is actuated causing a reversal of the motor 15 which motor continues to run until the carriage 20 has returned to a point ahead of the starting position. Limit switch 80 then reverses direction of the motor until it is advanced to the first position where the cell 32 senses a light and stops the motor.

Whereas I have described my invention in what I consider the most practical embodiment, it is clear that a great many details of construction can be changed without departing from the true scope of the invention. The true scope will be more particularly set forth in the appended claims and in the abstract preceding the specification.

I claim:

1. A combination audio-visual educational device comprising:

optical means for displaying a series of alternate questions and answers for selection of true or false answers;

control means responsive to the selection of a true answer to advance said optical display to the next question;

second control means responsive to the selection of a false answer to advance said optical means to the next succeeding answer; and auditory means adapted to orally give the true answer, said auditory means being responsive only to the selection of a false answer.

2. A combination audio-visual educational device of the type set forth in claim 1 wherein the auditory means comprises a magnetic tape having a plurality of parallel sound tracks; a magnetic pick-up head, said head being moveable transversely across said tape in response to movement of the optical means to the next succeeding position.

3. A combination audio-visual educational device of the type set forth in claim 1 including light sensing means for positioning the series of questions and answers for proper display and means associated with said optical means adapted to permit light to actuate said light sensing means when said questions and answers are properly positioned.

4. An audio-visual educational device of the type wherein a plurality of questions and multiple choice answers are visually displayed to a participant for selection of a true or false answer comprising:

an optical system including a viewing screen, a plurality of film frames, and a source of light adapted to project each of said film frames sequentially on said screen;

an auditory system including a magnetic tape having a plurality of parallel tracks, each track having recorded thereon the true answer to a corresponding film frame question, a magnetic pick-up head adapted for movement across said tape to register with successive tracks;

motor drive means adapted to advance said optical system to the next successive film frame and to advance said magnetic pick-up head to the successive magnetic track corresponding to the next successive film frame; and control means to cause the auditory system to become operative only upon selection by the participant of a false answer.

5. An educational device comprising:

a plurality of film frames, alternate frames being test frames and answer frames, each of said test frames including a question and multiple choice answers;

each said frame including a light passing spot in the same relative position, each said test frame having a light transmitting spot corresponding to the true answer;

optical means for projecting the message of each frame onto a viewing screen, and to project a light beam through each light passing spot;

means responsive to light passing through said first mentioned light passing spot to position each successive frame;

selector switch means adapted to select one of the multiple answers on the test frame;

control means responsive to said true selector switch and said second light passing spot to advance said film to the next test frame and responsive to one of said false selector switch to advance said film to the answer frame;

an endless loop magnetic tape having a plurality of parallel sound tracks;

a pick-up head mounted for movement across said tape to pick up successive sound tracks;

said means for advancing said film frames being also adapted to cause said pick-up head to advance across said magnetic tape; and means responsive to the selection of a false selector switch to cause movement of said magnetic tape past said pick-up head.

6. An educational device wherein a series of questions and multiple choice answers are displayed for the students choice between true and false answer, the combination comprising:

a viewing screen;

optical means for projecting a series of questions and multiple choice answers on said screen;

control means responsive to the selection of an answer to cause advance of said series of projections to the next position;

means responsive to the position of each said projection in fixed position;

sound reproducing means having a plurality of true answers thereon, said first mentioned control means being adapted to cause said sound reproducing means to advance to successive answers upon advance of said optical means to successive questions; and means responsive only to the selection of a false answer to activate said sound reproducing means.

References Cited
UNITED STATES PATENTS

| | | | |
|---|---|---|---|
| Re. 23,030 | 8/1948 | Holt | 35—9X |
| 2,650,097 | 8/1953 | Erdos | 35—35(3)X |
| 3,117,382 | 1/1964 | Schultzberger et al. | 35—9 |
| 3,266,172 | 8/1966 | Heinberg | 35—8 |
| 3,376,657 | 4/1968 | Dorsett | 35—9 |
| 3,395,464 | 8/1968 | Leslie et al. | 35—9 |

WILLIAM H. GRIEB, Primary Examiner